US009649722B2

(12) United States Patent
Wu

(10) Patent No.: US 9,649,722 B2
(45) Date of Patent: May 16, 2017

(54) ULTRASOUND-ASSISTED WATER-CONFINED LASER MICROMACHINING

(71) Applicant: Benxin Wu, Naperville, IL (US)

(72) Inventor: Benxin Wu, Naperville, IL (US)

(73) Assignee: Illinois Institute of Technology, Chicago, IL (US)

( * ) Notice: Subject to any disclaimer, the term of this patent is extended or adjusted under 35 U.S.C. 154(b) by 481 days.

(21) Appl. No.: 14/212,876

(22) Filed: Mar. 14, 2014

(65) Prior Publication Data
US 2014/0263213 A1 Sep. 18, 2014

Related U.S. Application Data

(60) Provisional application No. 61/787,902, filed on Mar. 15, 2013.

(51) Int. Cl.
*B23K 26/14* (2014.01)
*B23K 26/00* (2014.01)
*B23K 26/146* (2014.01)

(52) U.S. Cl.
CPC ........ *B23K 26/0093* (2013.01); *B23K 26/146* (2015.10)

(58) Field of Classification Search
CPC ...... B23K 26/0093; B23K 26/146; B24B 1/04
See application file for complete search history.

(56) References Cited

U.S. PATENT DOCUMENTS

| 4,386,256 | A | * | 5/1983 | Inoue | B23H 7/38 219/69.2 |
| 4,408,113 | A | * | 10/1983 | Inoue | B23H 7/38 219/69.2 |
| 4,444,146 | A | * | 4/1984 | De Witz | B08B 3/12 114/222 |
| 6,407,385 | B1 | * | 6/2002 | Okada | B08B 7/0042 250/307 |
| 2002/0050489 | A1 | * | 5/2002 | Ikegami | B23K 26/0732 219/121.69 |

(Continued)

FOREIGN PATENT DOCUMENTS

| GB | 2165330 A | * | 4/1986 |
| JP | 63-076786 A | * | 4/1988 |

OTHER PUBLICATIONS

B. Wu, "Career: Fundamental Research on a Novel Ultrasound-Assisted Water-Confined Laser Micromachining Technology", 2012 NSF Eng. Research and Innovation Conf., Boston MA, Jul. 2012, http://eot.neeshub.org/CMMI/poster/show/957.

(Continued)

*Primary Examiner* — Geoffrey S Evans
(74) *Attorney, Agent, or Firm* — Pauley Erickson & Kottis

(57) ABSTRACT

Systems and processes for improved laser machining, such as micro machining, of a workpiece. Systems and processes involve directing at a first surface of the workpiece a laser beam and wherein at least the laser-irradiated region of the first surface of the workpiece is immersed in a liquid, and delivering to the liquid-immersed and laser-irradiated workpiece surface region at least a first ultrasound output from a first ultrasound device. The ultrasound output and the laser beam desirably impact the workpiece first surface substantially simultaneously.

25 Claims, 3 Drawing Sheets

(56) References Cited

U.S. PATENT DOCUMENTS

2008/0056960 A1* 3/2008 Laugharn, Jr. .......... B01F 11/02
422/127
2014/0150826 A1* 6/2014 Albrecht ........... H01L 21/67057
134/25.5

OTHER PUBLICATIONS

National Science Foundation, "Career: Fundamental Research on a Novel Ultrasound-Assisted Water-Confinded Laser Micromachining Technology", printed Jul. 30, 2014, http://nsf.gov/awardsearch/showAward?AWD_ID=1055805&HistoricalAwards=false.

* cited by examiner

ULTRASOUND-ASSISTED WATER-CONFINED LASER MICROMACHINING

CROSS REFERENCE TO RELATED APPLICATION

This application claims the benefit of U.S. Provisional Patent Application, Ser. No. 61/787,902, filed on 15 Mar. 2013. The Provisional Patent Application is hereby incorporated by reference herein in its entirety and is made a part hereof, including but not limited to those portions which specifically appear hereinafter.

STATEMENT REGARDING FEDERALLY SPONSORED RESEARCH OR DEVELOPMENT

This invention was made with government support under grant/award CMMI 1055805 awarded by the National Science Foundation (NSF). The government has certain rights in the invention.

BACKGROUND OF THE INVENTION

Field of the Invention

This invention relates generally to the machining and, more particularly, to micromachining processing of workpieces.

Discussion of Related Art

Micromachining generally refers to the process of creating and/or modifying micro-features on a workpiece through the removal of material from the workpiece.

Micromachining through the use of a laser is a common micromachining technique. Laser micromachining technology affords numerous advantages, including good flexibility (due to the ease of controlling and varying of laser spot scanning trajectory), non-contact (where the primary machining tool, which is the laser beam, does not mechanically contact the workpiece), and high spatial resolution (down to less than 10 microns). Consequently, laser micromachining has many current and potential applications, such as including, but not necessarily limited to, creating microfeatures for medical devices and solar cells, and surface texturing of mechanical parts to enhance their tribological properties, for example.

Unfortunately, current forms of laser micromachining may often suffer from one or more of the following drawbacks:

(i) debris deposition, (ii) laser-induced harmful residual thermal effects (which may include surface oxidation layer, recast layer, heat affected zone, cracks, etc.), and (iii) harmful surface tensile residual stresses (which may weaken the mechanical properties of the workpiece), and which may also be regarded as a type of laser-induced harmful residual thermal effect.

The above-identified drawbacks may often be more difficult, expensive, and/or time-consuming to minimize, avoid or completely remove than is desired or preferred.

Thus, there is a need and a demand for techniques or processes and associated systems for micromachining whereby various of the above-identified advantages of laser micromachining can be realized while simultaneously avoiding or minimizing one, two or all three of the above-identified drawbacks that may be associated with conventional laser micromachining.

SUMMARY OF THE INVENTION

This invention provides a new system and process for laser micromachining whereby various of the above-identified advantages of laser micromachining can be realized while potentially simultaneously reducing, minimizing or avoiding one, two or all three of the above-identified drawbacks that may be associated with conventional laser micromachining.

In accordance with one aspect of the invention, there is provided a new system for machining a workpiece and, in a more specific embodiment, a new system for micromachining a workpiece. In accordance with one embodiment, such a system includes a laser source effective upon actuation to direct a laser beam to irradiate a region of a first surface of the workpiece. The system further includes a liquid immersion element such as in the form of a container (a tank, for example), and effective to immerse at least the first surface of the workpiece in liquid while a laser beam from the laser source is directed thereat. The system also includes a first ultrasound output device effective to deliver at least a first ultrasound output to the liquid-immersed workpiece surface. In a generally preferred practice, the ultrasound output and the laser beam impact the workpiece first surface simultaneously, e.g., at the same or substantially the same time.

In accordance with another aspect of the invention, there is provided and process for machining a workpiece and, in a more specific embodiment, a new process for micromachining a workpiece. In accordance with one embodiment, such a process involves directing at a region of a first surface of the workpiece a laser beam from a laser source and wherein at least the laser-irradiated region of the first surface of the workpiece is immersed in a liquid, and delivering to the liquid-immersed workpiece surface at least a first ultrasound output from a first ultrasound device. In a generally preferred practice, the ultrasound output and the laser beam impact the workpiece first surface simultaneously, e.g., at the same or substantially the same time.

As used herein, references to "laser ablation" or "laser machining" are to be understood to generally refer to material removal processes due to the absorption of laser beam energy.

Further, references to ultrasound output delivery to the first surface of the workpiece and laser beam impact on the first surface of the workpiece as being "simultaneous" or the like are to be understood to preferably refer to occurring or being at the same time or within a no more than an acceptable maximum time lag. In practice, what constitutes a maximum acceptable time lag may depend on process conditions (such as laser pulse duration, for example, when a pulsed laser is used), and is typically less than around 1 to 10 second and is typically significantly shorter than 1 to 10 second as ultrasound output delivery to the workpiece surface and the possibly induced cavitation process desirably occur before the laser-induced mass, and/or momentum and/or energy transport processes have mostly completed. Thus, in one preferred practice of the invention, the ultrasound is desirably applied while the laser beam impacts the workpiece surface. In accordance with one embodiment, such application can be realized through the ultrasound being appropriately applied to the workpiece before actuation of the laser beam and continuing as the laser beam desirably impacts the workpiece surface.

Further, references herein to a laser source effective upon actuation to direct a laser beam at a selected workpiece surface are to be understood as encompassing the inclusion of any or all relevant and/or necessary components, including optics, such as may be needed or desired for desired laser beam delivery including, for example, mirrors, lenses and/or laser scanner, for example.

Other objects and advantages will be apparent to those skilled in the art from the following detailed description taken in conjunction with the appended claims and drawings.

BRIEF DESCRIPTION OF THE DRAWINGS

Objects and features of this invention will be better understood from the following description taken in conjunction with the drawings, wherein.

DETAILED DESCRIPTION OF THE INVENTION

As described in greater detail below, the invention generally relates to a new process of or technique for micromachining, termed herein as "Ultrasound-Assisted Water-Confined Laser Micromachining", also sometimes referred to as "UWLM," and related processing systems.

In UWLM processing herein described, material removal occurs from the workpiece surface that faces towards the incoming laser beam and is mainly due to absorption of laser energy by the workpiece. Thus, to that that extent, UWLM processing as herein provided may be somewhat similar to some forms of currently existing laser micromachining technology. In UWLM processing, however, water or other suitable liquid layer is applied onto the laser-irradiated region of the workpiece surface, and an in-situ ultrasound is delivered to the liquid-immersed and laser-irradiated workpiece surface region. This may result in, produce or generate ultrasonic cavitation in the liquid (i.e., produce bubbles). The subsequent collapse or implosion of cavitation bubbles can or may produce high pressure and promote liquid motion and mixing, which can or may produce one or more of cleaning, cooling and peening effects. These effects: (1) can or may reduce redeposition of debris and/or one or more harmful residual thermal effect and/or surface tensile residual stresses such as may be induced by or associated with laser ablation, and (2) may possibly enhance the material removal rate from the workpiece per laser pulse (when a pulsed laser is used) as compared with laser ablation of the liquid-immersed workpiece without the application of the ultrasound.

Figure 2:
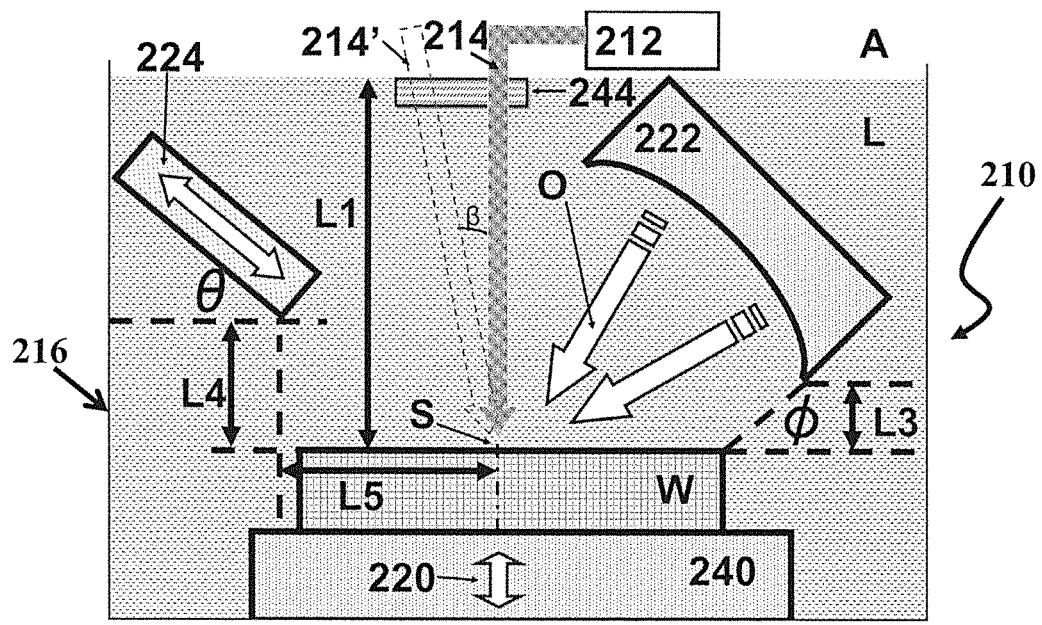
Figure 3:
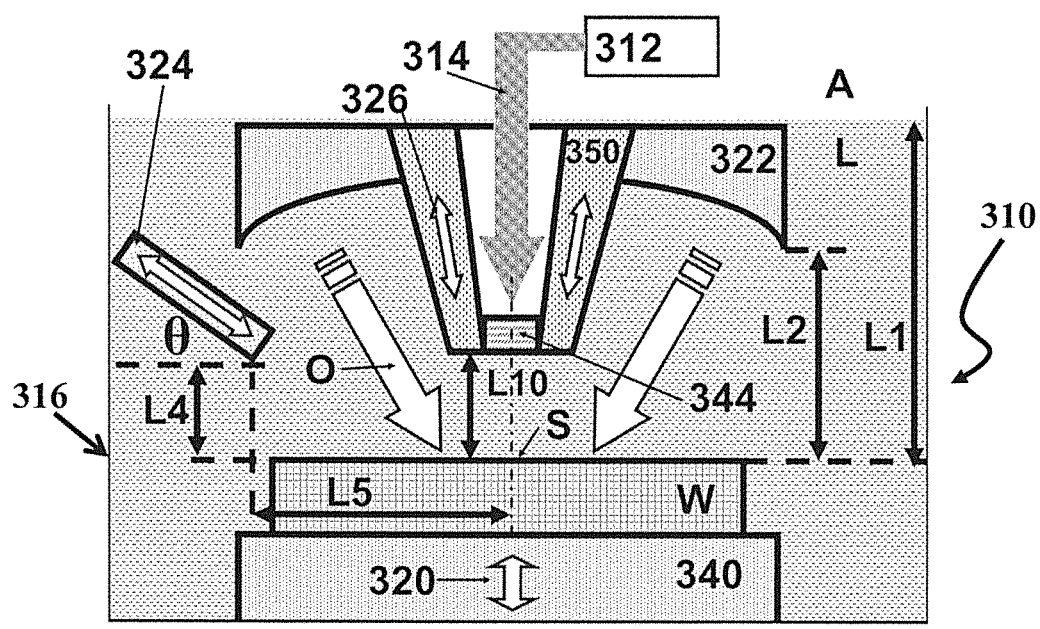

Those skilled in the art and guided by the teachings herein provided will understand and appreciate that the present invention may be appropriately embodied in a variety of different systems and processes. As representative, FIGS. 1-3 are, as identified above, simplified schematic representations of selected alternative embodiments of Ultrasound-Assisted Water-Confined Laser Micromachining (UWLM) in accordance with the invention.

Figure 1:
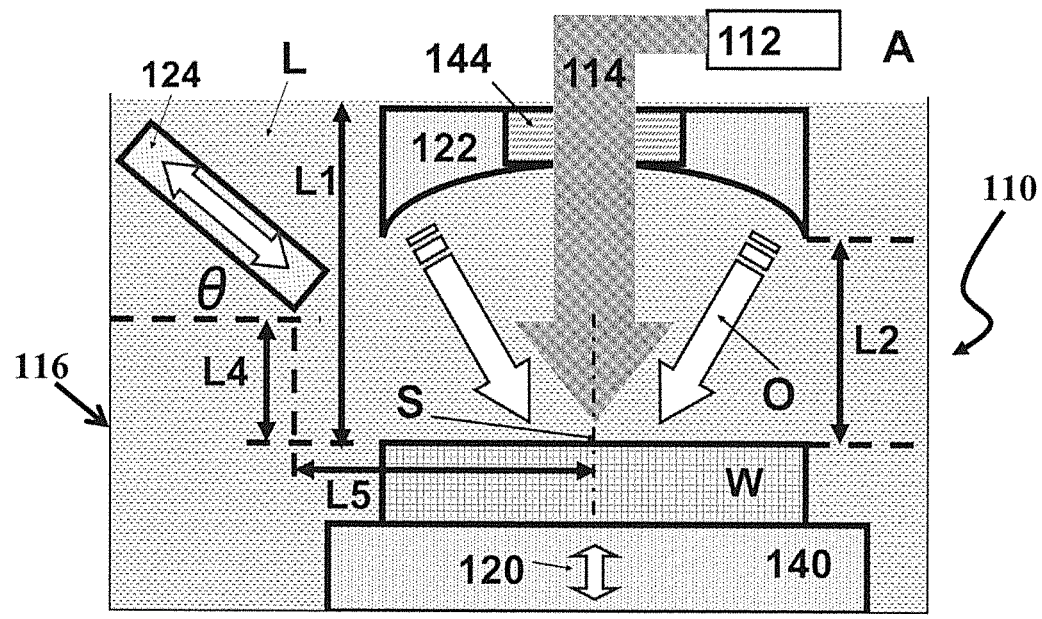
FIGS. 1-3 are simplified schematic representations of selected alternative embodiments of Ultrasound-Assisted Water-Confined Laser Micromachining (UWLM) in accordance with the invention.

Turning first to FIG. 1, there is illustrated a system, generally designated by the reference numeral 110 in accordance with one preferred embodiment of the invention and useful in micromachining processing of a workpiece W and, more specifically, the surface region S thereof.

The system 110 includes a laser source 112 effective upon actuation to direct a laser beam 114 at the workpiece surface region S. The system 110 also includes a liquid immersion element 116, such as may be in the form of a container, such as a tank or the like, for example, and such as effective to immerse at least the workpiece surface region S in a liquid L while the laser beam 114 is directed thereat. The system 110 further includes one or more ultrasound output devices 120, 122, and 124, for example, to deliver respective ultrasound outputs, such as ultrasonic vibrations or waves such as those designated with the reference character O, to the liquid-immersed workpiece surface region S. It will be appreciated that while FIG. 1 shows the workpiece W totally immersed in a liquid L and thus out of the ambient air (or other ambient environment) A, the broader practice of the invention is not necessarily so limited provided the workpiece surface region at which the laser beam is directed is appropriately immersed in the liquid.

The micromachining processing system 110 includes an optional base 140 such as upon which the workpiece W is disposed. If desired and such as shown, the base 140, if present, may include or contain an ultrasound output device 120 such as in the form of an ultrasonically vibrating device. In one alternative embodiment, the base may be replaced by a suitable ultrasound output device.

The ultrasound output device 122, if included, may include or contain an optional optical window 144 which permits transmission of the laser beam 114 therethrough and/or facilitates the delivery of the laser beam to the workpiece surface region S. Those skilled in the art and guided by the teachings herein provided will understand and appreciate that such an optical window, if included in a system, can desirably be alternatively located and/or positioned in selected embodiments.

One or more of the ultrasound output devices in this and other embodiments may, if desired, contain or include an associated horn or tip such as to appropriately enhance the device ultrasonic vibration and/or direct the ultrasound output at or to the workpiece surface region S.

Further, one or more of the ultrasound output devices in this and other embodiments may, if desired, contain, include or have the form of a high intensity focused ultrasound transducer (with a focal length of $F_{HIFU}$), such as shown for the ultrasound output device 122.

While the system 110 is shown and has been described above with multiple ultrasound output devices 120, 122, and 124, for example, it is to be understood and appreciated that the invention can, if desired, be practiced with only one or various combinations of two or more of such ultrasound output devices.

FIG. 2 illustrates a system, generally designated by the reference numeral 210, in accordance with another preferred embodiment of the invention and useful in micromachining processing of a workpiece W and, more specifically, the surface region S thereof.

The system 210 is somewhat similar to the system 110, described above. The system 210 includes a laser source 212 effective upon actuation to direct a laser beam 214 at the workpiece surface region S. The system 210 also includes a liquid immersion element 216, such as may be in the form of a container, such as a tank or the like, for example, and such as effective to immerse at least the workpiece surface region S in a liquid L while the laser beam 214 is directed thereat. The system 210 further includes one or more ultrasound output devices 220, 222, and 224, for example, to deliver respective ultrasound outputs such as ultrasonic vibrations or waves, such as designated by the reference character O, to the liquid-immersed workpiece surface region S. Again, it will be appreciated that while FIG. 2 shows the workpiece W totally immersed in liquid L and thus out of the ambient air (or other ambient environment) A, the broader practice of the invention is not necessarily so limited provided the workpiece surface region S at which the laser beam 214 is directed is appropriately immersed in the liquid.

As with the system 110, the micromachining processing system 210 includes an optional base 240 such as upon which the workpiece W is disposed. If desired and such as shown, the base 240, if present, may include or contain an ultrasound output device 220 such as in the form of an ultrasonically vibrating device. In one alternative embodiment, the base may be replaced by a suitable ultrasound output device.

In the system 210, the ultrasound output device 222, if included, is disposed at an angle Φ relative to the workpiece surface region S.

Further, the system 210 may include or contain an optional optical window 244 which permits transmission of the laser beam 214 therethrough and/or facilitates the delivery of the laser beam to the workpiece surface region S. The optical window 244 is shown as positioned spaced away from the ultrasound output device 222. Those skilled in the art and guided by the teachings herein provided will understand and appreciate that such an optical window, if included in a system, can desirably be alternatively located and/or positioned in selected embodiments.

Additionally, as shown in FIG. 2, the laser beam, such as shown in phantom by the laser beam 214', can, if desired, be directed at the workpiece surface region S at an angle β relative to vertical. Those skilled in the art will understand and appreciate that such angular directing of the laser beam is similarly appropriately applicable in the other of the UWLM systems herein described.

As with the system 110 described above, while the system 210 is shown and has been described above with multiple ultrasound output devices 220, 222, and 224, for example, it is to be understood and appreciated that the invention can, if desired, be practiced with only one or various combinations of two or more of such ultrasound output devices.

FIG. 3 illustrates a system, generally designated by the reference numeral 310, in accordance with another preferred embodiment of the invention and useful in micromachining processing of a workpiece W and, more specifically, the surface region S thereof.

The system 310 is somewhat similar to the systems 110 and 210, described above. The system 310 includes a laser source 312 effective upon actuation to direct a laser beam 314 at the workpiece surface region S.

The system 310 also includes a liquid immersion element 316, such as may be in the form of a container, such as a tank or the like, for example, and such as effective to immerse at least the workpiece surface region S in a liquid L, such as water, while the laser beam 314 is directed thereat.

The system 310 further includes one or more or a combination of ultrasound output devices 320, 322, 324, and 326, for example, to deliver respective ultrasound outputs such as ultrasonic vibrations or waves, such as designated by the reference character O, to the liquid-immersed workpiece surface region S. Again, it will be appreciated that while FIG. 3 shows the workpiece W totally immersed in liquid L and thus out of the ambient air (or other ambient environment) A, the broader practice of the invention is not necessarily so limited provided the workpiece surface region S at which the laser beam 314 is directed is appropriately immersed in the liquid.

As with the system 110, the micromachining processing system 310 includes an optional base 340 such as upon which the workpiece W is disposed. If desired and such as shown, the base 340, if present, may include or contain an ultrasound output device 320 such as in the form of an ultrasonically vibrating device. In an alternative embodiment, the base may be replaced by a suitable ultrasound output device.

The system 310 may include an optional focused ultrasound output device 322 and/or a support structure 350. If desired, the structure 350 may include, contain or be replaced by the ultrasound output device 326. The structure 350 and/or the device 326 are shown as disposed at a selected distance, designated L10, from the workpiece surface region S, and may be appropriately angled relative to the laser beam 314, and may, if desired, include provision for the inclusion of an optical window 344, similar to those described above.

As with the systems 110 and 210 described above, while the system 310 is shown and has been described above with multiple ultrasound output devices, it is to be understood and appreciated that the invention can, if desired, be practiced with only one or various combinations of two or more of such ultrasound output devices.

It should also be noted that in FIGS. 1 to 3, the symbol ϑ represents ultrasonic vibrations.

Further, while the systems 110, 210, and 310 have been described above making reference to liquid immersion elements, such as may be in the form of a container, such as a tank for example, it will be understood by those skilled in the art and guided by the teachings herein provided that the broader practice of the invention is not necessarily so limited. For example, if desired, the invention may be practiced employing a liquid immersion element such as a liquid-flowing device, such as a liquid nozzle. Further, if desired, the invention can be practiced employing a flowing fluid within a container.

Figure 4:
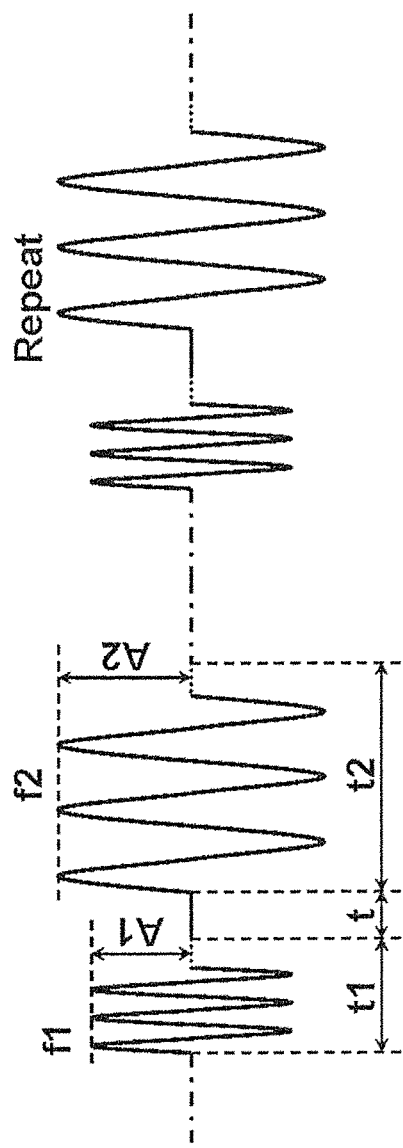
FIG. 4 is a schematic diagram of the input signal for ultrasound output devices in UWLM set-ups, such as shown in FIGS. 1-3, respectively.

FIG. 4 is a schematic diagram of the ultrasonic transducer input signal for ultrasound output devices in the UWLM setups shown in FIGS. 1 to 3. In FIG. 4, the horizontal axis represents time, while the vertical axis represents the signal amplitude. The signals may repeat with time continuously, or stop at certain points in time for a period of time and then re-start; the ultrasound transducer input signal frequencies f1 & f2, amplitudes A1 & A2, pulse durations t1 & t2 and delay time between the two signal pulses, t, may each be at various appropriate values. Ultrasound transducer input signals with more than two frequencies (f1, f2, f3 . . . ) may also be employed in UWLM. UWLM with all the possible forms of the transducer input signals are considered to be included in or as a part of this invention development and the subject invention disclosure and description.

It is to be further understood that the various parameters identified in each figure or the above text, such as $f_1$, $f_2$; $A_1$, $A_2$; $t_1$, $t_2$, t; L1 to L5, L10 (where L's are lengths or distances); β, Φ, and θ (which are angles); and $F_{HIFU}$, may be at appropriate various values. In each figure, all the other possible geometric parameters that are not specifically identified may also be at various appropriate values. Further, the transducer input signal parameters ($f_1$, $f_2$, $A_1$, $A_2$, $t_1$, $t_2$, and t) can be the same or different for the transducers of different ultrasound output devices in each of the various UWLM setups.

The geometrical and other parameters that are not labeled in FIGS. 1 to 4 may also be at various values. The sizes and/or shapes of components in the UWLM systems may also vary, and may be different from those shown in FIGS. 1 to 3. FIGS. 1 to 3 are not drawn to scale.

For example, in FIG. 4, when $f_1=f_2$, the signal will become a single-frequency signal. When t=0, the signal will change from a pulsed mode to a continuous mode. In accordance with the invention, in UWLM, ultrasound transducer input signals with more than 2 frequencies ($f_1$, $f_2$, $f_3$ ...) may also be used, where the amplitudes, pulse durations, pulse-to-pulse temporal distances, and relative timing of the signals at each frequency may also be at various appropriate values. For an UWLM setup with two or more transducers, if only one transducer has non-zero input signals, the setup will become a single-transducer setup. In addition, in an UWLM setup, possible laser parameters, such as the focal length of the laser focusing lens, laser wavelength, laser beam intensity, beam diameter, laser pulse duration, pulse repetition rate, and the laser pulse relative timing with the ultrasound transducer input signals, etc., may also be at various appropriate values. Lasers that are operated in a continuous or pulsed mode may be used in UWLM. Further, while the invention has been generally described above with reference to the use of water, those skilled in the art and guided by the teachings herein provided will appreciate that liquids other than water can be used in the laser micromachining processing herein described and the uses of such other liquids are to be understood as herein encompassed.

Table 1, below, shows the corresponding figures for each UWLM setup.

TABLE 1

| UWLM Setup | Corresponding FIGS. |
|---|---|
| 1 | FIG. 1 + FIG. 4 |
| 2 | FIG. 2 + FIG. 4 |
| 3 | FIG. 3 + FIG. 4 |

As will be appreciated, operation of systems such as described above can be appropriately and specifically tailored to achieve or realize specific desired performance objectives.

For example, in one embodiment, a first ultrasound output device delivers at least first and second ultrasound outputs and wherein the first and second ultrasound outputs differ in at least one aspect selected from the group consisting of: point of initial impact onto the liquid-immersed workpiece surface, time of initial impact onto the liquid-immersed workpiece surface and angle of initial impact onto the liquid-immersed workpiece surface.

In another embodiment, a first ultrasound output device delivers at least a first ultrasound output initially impacting the liquid-immersed workpiece surface at a first location and the first ultrasound output device also delivers at least a second ultrasound output initially impacting the liquid-immersed workpiece surface at a second location and wherein the first location is spaced from the second location.

In another embodiment, a first ultrasound output device delivers at least a first ultrasound output initially impacting the liquid-immersed workpiece surface at a first point in time and at least one ultrasound output device also delivers at least a second ultrasound output initially impacting the liquid-immersed workpiece surface at a second point in time and wherein the second point in time is after the first point in time.

In another embodiment, a first ultrasound output device delivers at least a first ultrasound output impacting the liquid-immersed workpiece surface at a first angle of initial impact and the first ultrasound output device also delivers at least a second ultrasound output impacting the liquid-immersed workpiece surface at a second angle of impact and wherein the first angle of initial impact differs from the second angle of initial impact.

In another embodiment, a UWLM system such as herein provided, in addition to a first ultrasound output device such as delivers a first ultrasound output, desirably additionally includes a second ultrasound output device effective to deliver a second ultrasound output to the liquid-immersed workpiece surface. As will be appreciated, such first and second ultrasound outputs can, if desired, be appropriately selected and/or designed to differ in at least one aspect selected from the group consisting of: ultrasound frequency, amplitude and pulse duration, for example.

Those skilled in the art and guided by the teaching herein provided will appreciate that laser beams, with suitable parameters, as herein provided may appropriately ablate various types of materials, such as metals, semiconductors, and dielectric materials. Laser beams with suitable parameters may also be used to ablate bones and other biological materials for biomedical applications (e.g., surgery). The application of UWLM to any type of workpiece materials for the production or modification of features with any size or shape should be regarded as being encompassed herein.

Those skilled in the art and guided by the teachings herein provided will further appreciate and understand that the broader practice of the invention is not necessarily limited by or to ultrasound output devices of specific size, design or mode of operation as various devices for generating or producing ultrasound outputs are known and may be appropriately incorporated into the practice of the invention.

Compared with current or existing laser micromachining technology, UWLM as herein described and/or provided can potentially increase machining efficiency (e.g., the removal rate of material from a workpiece) per laser pulse and/or enhance machining quality in numerous related applications. Further, such applications may include (but are not necessarily limited to): (1) micromachining processes that are needed in the manufacture of solar cells, microelectromechanical systems (MEMS), and medical devices, and (2) surface texturing (through UWLM) of mechanical parts to enhance their tribological properties and decrease the related energy consumption due to the friction during their service.

It is further contemplated that a suitable ultrasound output into the liquid in accordance with the invention may be generated by ultrasonically vibrating a bottom and/or one or more side wall of the liquid container (e.g., 116, 216, and 316 in FIGS. 1 to 3, respectively), and is herein encompassed.

Further, while the invention development has been described above making specific reference to micromachining, those skilled in the art and guided by the teachings herein provided will appreciate that the broader practice of the invention is not necessarily so limited. For example, if desired, the invention and/or the teachings herein may similarly be applied to the production or modification of features outside the micro-scale range in an appropriate workpiece.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention. All the possible forms of UWLM, including those that result from variations of the geometrical, ultrasound, laser and other parameters (whether or not the parameters are specifically identified in the text or figures), are considered to be included in or as a part of this invention and the subject invention description and disclosure. Further, all the possible forms of UWLM, including those that result from the combinations of two or more of the UWLM setups described above (each setup may be in its complete or partial form), are considered to be included in or as a part of this invention and the subject invention description and disclosure. Those skilled in the art and guided by the teachings herein provided will appreciate that other specific forms of UWLM, where ultrasound is delivered to a liquid-immersed workpiece surface that faces towards an incoming laser beam, are possible and that all such approaches are considered to be included in or as a part of this invention development and the subject invention description and disclosure.

What is claimed is:

1. A system for machining a workpiece, the system comprising:
    a laser source effective upon actuation to direct a laser beam to irradiate a region of a first surface of the workpiece;
    a liquid immersion element effective to immerse at least the laser-irradiated region of the first surface of the workpiece in liquid while a laser beam from the laser source is directed thereat; and
    a first ultrasound output device effective to deliver, through the liquid above the first surface, at least a first ultrasound output to the liquid-immersed and laser-irradiated workpiece surface region to generate ultrasonic cavitation in the liquid.

2. The system of claim 1 wherein the ultrasound output delivery to the first surface of the workpiece is simultaneous with the laser bean impact on the first surface of the workpiece.

3. The system of claim 1 wherein ultrasound output delivery to the liquid-immersed workpiece surface is effective to at least one of: remove or reduce laser machining debris, reduce one or more laser-induced harmful residual thermal effect, peen the first surface of the workpiece, enhance the cooling of the first surface of the workpiece, and enhance the material removal rate per laser pulse from the workpiece.

4. The system of claim 1 comprising a base to support the workpiece and wherein the base provides at least the first ultrasound output to the liquid-immersed workpiece surface.

5. The system of claim 1 wherein the first ultrasound output device comprises an ultrasound transducer.

6. The system of claim 5 wherein the ultrasound transducer is a high intensity focused ultrasound transducer.

7. The system of claim 1 additionally comprising an optical window, the optical window at least one of either permitting the laser source to direct the laser beam therethrough to the first surface of the workpiece and/or facilitating delivery of the laser beam to the first surface of the workpiece.

8. The system of claim 1 wherein the first ultrasound output device delivers at least first and second ultrasound outputs and wherein the first and second ultrasound outputs differ in at least one aspect selected from the group consisting of: point of initial impact onto the liquid-immersed workpiece surface, time of initial impact onto the liquid-immersed workpiece surface and angle of initial impact onto the liquid-immersed workpiece surface.

9. The system of claim 8 wherein the first ultrasound output device delivers at least a first ultrasound output initially impacting the liquid-immersed workpiece surface at a first location and the first ultrasound output device also delivers at least a second ultrasound output initially impacting the liquid-immersed workpiece surface at a second location and wherein the first location is spaced from the second location.

10. The system of claim 8 wherein the first ultrasound output device delivers at least a first ultrasound output initially impacting the liquid-immersed workpiece surface at a first point in time and the first ultrasound output device also delivers at least a second ultrasound output initially impacting the liquid-immersed workpiece surface at a second point in time and wherein the second point in time is after the first point in time.

11. The system of claim 8 wherein the first ultrasound output device delivers at least a first ultrasound output impacting the liquid-immersed workpiece surface at a first angle of initial impact and the first ultrasound output device also delivers at least a second ultrasound output impacting the liquid-immersed workpiece surface at a second angle of impact and wherein the first angle of initial impact differs from the second angle of initial impact.

12. The system of claim 1 additionally comprising a second ultrasound output device effective to deliver a second ultrasound output to the liquid-immersed workpiece surface.

13. The system of claim 12 wherein the first and second ultrasound outputs differ in at least one aspect selected from the group consisting of: ultrasound frequency, amplitude and pulse duration.

14. The system of claim 1 comprising an optical window support structure supporting an optical window at a selected distance to the first surface of the workpiece.

15. The system of claim 1 wherein the first ultrasound output is in continuous mode.

16. The system of claim 1 wherein the liquid is water.

17. The system of claim 1 wherein the first ultrasound output is in pulsed mode.

18. A system of claim H for machining a workpiece, the system comprising:
    a laser source effective upon actuation to direct a laser beam to irradiate a region of a first surface of the workpiece;
    a liquid immersion element effective to immerse at least the laser-irradiated region of the first surface of the workpiece in liquid while a laser beam from the laser source is directed thereat;
    a first ultrasound output device effective to deliver at least a first ultrasound output to the liquid-immersed and laser-irradiated workpiece surface region; and
    an optical window support structure supporting an optical window at a selected distance to the first surface of the workpiece,
    wherein the optical window support structure is integral with the first ultrasound output device.

19. A process for machining a workpiece, the process comprising:
    directing at a region of a first surface of the workpiece a laser beam from a laser source and wherein at least the laser-irradiated region of the first surface of the workpiece is immersed in a liquid, and
    delivering through the liquid above the liquid-immersed and laser-irradiated workpiece surface region at least a first ultrasound output from a first ultrasound device, wherein the first ultrasound output generates ultrasonic cavitation in the liquid.

20. The process of claim 19 wherein the ultrasound output delivery to the first surface of the workpiece is simultaneous with the laser beam impact on the first surface of the workpiece.

21. The process of claim 19 additionally comprising:
delivering to the liquid-immersed workpiece surface a second ultrasound output wherein the second ultrasound output differs from the first ultrasound output in at least one aspect selected from the group consisting of: ultrasound frequency, amplitude, pulse duration, and point or angle of initial contact.

22. The process of claim 21 wherein the first ultrasound device delivers both the first and the second ultrasound outputs to the liquid-immersed workpiece surface.

23. The process of claim 21 wherein the second ultrasound output is delivered from a second ultrasound device, the second ultrasound device spaced apart from the first ultrasound device.

24. The process of claim 19 wherein delivery of ultrasound output to the liquid-immersed workpiece first surface is effective to at least one of: remove or reduce laser machining debris, reduce one or more laser-induced harmful residual thermal effect, peen the first surface of the workpiece, enhance the cooling of the first surface of the workpiece, and enhance the material removal rate per laser pulse from the workpiece.

25. The process of claim 19 wherein the liquid is water.

* * * * *